United States Patent Office 3,178,338
Patented Apr. 13, 1965

3,178,338
METHOD OF COMBATING NEMATODES, AND NEMATOCIDAL PREPARATIONS
Adolf Emil Siegrist, Basel, and Rudolf Anliker, Binningen, Switzerland, assignors to Ciba Limited, Basel, Switzerland, a company of Switzerland
No Drawing. Filed Dec. 18, 1962, Ser. No. 245,433
Claims priority, application Switzerland, Dec. 28, 1961, 15,113/61
5 Claims. (Cl. 167—33)

The present invention provides nematocidal preparations containing as active principle 1:3:4-thiadiazole-thiophene compounds of the general formula (1) 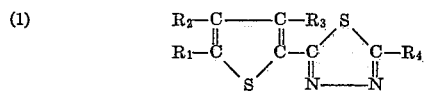

in which $R_1$ represents a hydrogen or chlorine atom, or an alkyl group with 1 to 4 carbon atoms, or the group

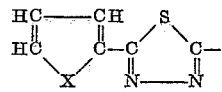

in which X is an oxygen or sulfur atom; $R_2$ and $R_3$ may be identical or different and each represents a hydrogen atom or an alkyl group with 1 to 4 carbon atoms, and $R_4$ represents a mononuclear or binuclear aromatic radical which may be substituted by one or several lower alkyl or alkoxy groups or halogen atoms, or a 5-membered or 6-membered heterocyclic radical and at least one of the following additives: Solvents with a boiling point of at least 100° C., solid carriers, dispersants, wetting or adhesive agents, fertilizers, and other pesticides.

Particularly valuable preparations for combating nematodes—more especially nematodes that cause damage in agriculture or horticulture—are those which contain as the active principle a compound of the general Formula 1 in which $R_1$ represents a hydrogen atom or a methyl group or the group

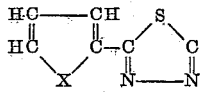

in which X represents an oxygen or sulfur atom; $R_2$ stands for a hydrogen atom, $R_3$ for a hydrogen or chlorine atom or a methyl group, and $R_4$ represents a phenyl radical which may be substituted by at least one alkyl or alkoxy group with 1 to 4 carbon atoms or by at least one chlorine atom, or represents a thienyl, furyl, pyridyl, diphenyl or naphthyl group.

Furthermore, there deserve special mention as the active principle those of the general formula

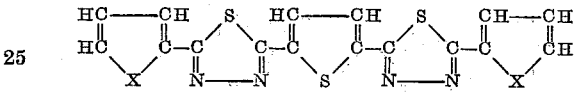

in which X stands for an oxygen or sulfur atom.

As examples of compounds of the general Formula 1 to be used according to this invention there may be mentioned the compounds listed in the following Table 1:

Table 1

| No. | Formula | Properties | Analysis (molecular weight) Calculated | Analysis (molecular weight) Found |
|---|---|---|---|---|
| 1 | (structure) | Light-yellow, fine, shiny needles, M.P., 157.2–157.8° C. (ethanol). | C, 47.97; H, 2.42; N, 11.19; S, 38.42 (250.37) | C, 47.92; H, 2.78; N, 11.30; S, 38.34. |
| 2 | (structure) | Colorless, very fine needles, M.P., 168.6–169.2° C. (dioxane+water 2:1). | C, 51.70; H, 2.53; N, 10.05 (278.79) | C, 51.61; H, 2.34; N, 10.03. |
| 3 | (structure) | Yellow, shiny, fine flakes, melting above 300° C. (ortho-dichlorobenzene). | C, 46.13; H, 1.94; N, 13.45; S, 38.49 (416.60) | C, 45.85; H, 1.93; N, 13.67; S, 38.29. |
| 4 | (structure) | Pale-yellow, flakes, M.P., 137.2–138° C. (ethanol+water 2:1). | C, 60.44; H, 3.90; N, 10.84 (258.36) | C, 60.57; H, 3.93; N, 10.91. |
| 5 | (structure) | Colorless, felted needles, M.P., 109.4–110° C. (ethanol+water 4:1). | C, 63.96; H, 5.37; N, 9.32 (300.45) | C, 63.71; H, 5.46; N, 9.20. |
| 6 | (structure) | Colorless, shiny flakes, M.P., 170.4–171.2° C. (ethanol+water 3:1). | C, 61.73; H, 4.44; N, 10.29 (272.40) | C, 61.96; H, 4.40; N, 10.14. |
| 7 | (structure) | Colorless, shiny needles, M.P., 122.2–122.8° C. (ethanol). | C, 51.70; H, 2.53; N, 10.05 (278.79) | C, 51.82; H, 2.39; N, 9.80. |
| 8 | (structure) | Colorless, very fine needles, M.P., 179.5–180° C. (ethanol+water 9:1). | C, 46.01; H, 1.93; N, 8.94 (313.24) | C, 46.41; H, 1.88; N, 8.98. |

3,178,338

Table 1—Continued

| No. | Formula | Properties | Analysis (molecular weight) Calculated | Found |
|---|---|---|---|---|
| 9 | (thiophene-thiadiazole-C6H4-OCH3) | Pale-yellow, shiny flakes, M.P., 166.4–167.6° C. (ethanol). | C, 56.91<br>H, 3.67<br>N, 10.21<br>(274.37) | C, 56.92.<br>H, 3.56.<br>N, 10.40. |
| 10 | (thiophene-thiadiazole-C6H3(OCH3)(CH3)) | Almost colorless, shiny needles, M.P., 191–191.6° C. (ethanol + water 2:1). | C, 58.31<br>H, 4.19<br>N, 9.71<br>(288.40) | C, 58.54.<br>H, 4.04.<br>N, 9.70. |
| 11 | (thiophene-thiadiazole-C6H3(OCH3)(CH3)) | Almost colorless, very fine felted needles, M.P., 132.2–132.8° C. (ethanol+water 1:1). | C, 58.31<br>H, 4.19<br>N, 9.71<br>(288.40) | C, 58.15.<br>H, 3.99.<br>N, 9.70. |
| 12 | (thiophene-thiadiazole-biphenyl) | Colorless, shiny, very small needles, M.P., 212–212.6° C. (dioxane+ethanol 5:1). | C, 67.47<br>H, 3.78<br>N, 8.74<br>(320.41) | C, 67.55.<br>H, 3.95.<br>N, 8.69. |
| 13 | (thiophene-thiadiazole-naphthyl) | Almost colorless, very fine needles, M.P., 165–167° C. (ethanol+water 4:1). | C, 65.28<br>H, 3.42<br>N, 9.52<br>(294.38) | C, 65.18.<br>H, 3.29.<br>N, 9.39. |
| 14 | (thiophene-thiadiazole-pyridyl) | Colorless, very fine, felted needles, M.P., 168–169° C. (dioxane+ethanol+water 2:2:3). | C, 53.85<br>H, 2.88<br>N, 17.13<br>(245.33) | C, 54.10.<br>H, 3.02.<br>N, 17.26. |
| 15 | (dimethylthiophene-thiadiazole-C6H4-CH3) | Pale-yellow, very fine felted needles, M.P., 165–166° C. (ethanol+water 2:1). | C, 62.90<br>H, 4.93<br>N, 9.78<br>(286.41) | C, 62.73.<br>H, 4.86.<br>N, 10.06. |
| 16 | (dimethylthiophene-thiadiazole-C6H4-C(CH3)3) | Almost colorless, fine, crystalline powder, M.P., 187.8–188.2° C. (ethanol+water 2:1). | C, 65.81<br>H, 6.14<br>N, 8.53<br>(328.51) | C, 65.75.<br>H, 6.10.<br>N, 8.60. |
| 17 | (dimethylthiophene-thiadiazole-C6H3(CH3)2) | Colorless, very fine felted needles, M.P., 146.6–147.4° C. (ethanol+water 5:2). | C, 63.96<br>H, 5.37<br>N, 9.32<br>(300.45) | C, 64.11.<br>H, 5.43.<br>N, 9.50. |
| 18 | (dimethylthiophene-thiadiazole-C6H4-Cl) | Almost colorless, very fine felted needles, M.P., 168–169° C. (dioxane+water 6:5). | C, 54.80<br>H, 3.61<br>N, 9.13<br>(306.85) | C, 54.73.<br>H, 3.37.<br>N, 9.23. |
| 19 | (dimethylthiophene-thiadiazole-C6H3Cl2) | Light-yellow, shiny needles, M.P., 170.8–171.4° C. (ethanol+dioxane+water 9:3:1). | C, 49.27<br>H, 2.95<br>N, 8.21<br>(341.30) | C, 49.40.<br>H, 2.94.<br>N, 8.18. |
| 20 | (dimethylthiophene-thiadiazole-C6H4-OCH3) | Colorless, shiny needles, M.P., 170.8–171.6° C. (dioxane+ethanol+water 1:1:1). | C, 59.57<br>H, 4.67<br>N, 9.26<br>(302.43) | C, 59.73.<br>H, 4.71.<br>N, 9.28. |
| 21 | (dimethylthiophene-thiadiazole-C6H3(OCH3)(CH3)) | Faintly beige-brown shiny, felted needles, M.P., 139.2–139.6° C. (methanol+water 1:1). | C, 60.73<br>H, 5.10<br>N, 8.85<br>(316.45) | C, 60.94.<br>H, 5.05.<br>N, 8.63. |

Table 1—Continued

| No. | Formula | Properties | Analysis (molecular weight) Calculated | Found |
|---|---|---|---|---|
| 22 | (structure with dithiolane ring fused to 1,3,4-thiadiazoline linked to 3,4-dimethoxyphenyl group, with CH$_3$ and H$_3$C–C substituents) | Pale-yellow, very fine, felted needles, M.P., 182–182.5° C. (dioxane+water 1:1). | C, 57.81 H, 4.85 N, 8.43 (332.45) | C, 57.82. H, 4.67. N, 8.45. |
| 23 | (structure with two fused heterocyclic rings containing S, N, N, O with CH$_3$ substituents) | Pale-yellow, fine crystalline powder, M.P., 142.8–144.2° C. (methanol+water 2:1). | C, 54.94 H, 3.84 N, 10.68 S, 24.44 (262.36) | C, 55.13. H, 3.95. N, 10.67. S, 24.60. |
| 24 | (structure with dithiolane-thiadiazoline linked to 3,4-dimethoxyphenyl) | Pale-yellow, very fine needles, M.P., 158.8–159.1° C. (ethanol+water 3:4). | C, 55.24 H, 3.97 N, 9.20 (304.40) | C, 55.29. H, 3.88. N, 9.12. |
| 25 | (structure with dithiolane-thiadiazoline linked to phenyl) | Colorless, very fine needles, M.P., 134.9–135.4° C. (ethanol+water 1:1). | C, 58.99 H, 3.30 N, 11.47 (244.32) | C, 59.06. H, 3.31. N, 11.22. |
| 26 | (structure with dithiolane-thiadiazoline linked to pyridyl, with CH$_3$ groups) | Light-yellow, shiny needles, M.P., 163.2–165.2° C. (ethanol+water 2:1). | C, 57.11 H, 4.06 N, 15.37 (273.39) | C, 57.18. H, 4.00. N, 15.07. |
| 27 | (structure with dithiolane-thiadiazoline linked to pyridyl isomer, with CH$_3$ groups) | Pale-yellow, very fine, felted needles, M.P., 133.2–135° C. (ethanol+water 1:2). | C, 57.11 H, 4.06 N, 15.37 (273.39) | C, 56.81. H, 4.61. N, 15.35. |
| 28 | (bis-heterocyclic structure with multiple fused rings containing O, N, S) | Yellow, fine, crystalline powder melting above 300° C. (ortho-dichlorobenzene). | C, 49.98 H, 2.10 N, 14.57 (384.47) | C, 49.98. H, 2.25. N, 14.68. |

The manufacture of the active principles of the general Formula 1 incorporated with the agents of the invention has been described in detail in British Patent No. 900.815, granted October 31, 1962 to Ciba Limited.

The active principles of the general Formula 1 may be used as solutions, emulsions or dispersions or as dusting agents, by themselves or in admixture with the aforementioned additives, for example in conjunction with fertilizers, ammonium salts, phosphates, calcium cyanamide or urea, and also with pesticides, for example chlorinated hydrocarbons, carbamates, thiocarbamates, phosphoric acid esters and the like.

The new agents may further contain identifying agents, bactericides, fungicides and additional nematocides.

Aqueous sprays containing active principles of the general Formula 1 may be prepared from emulsion concentrates, pastes or wettable spray powders by the addition of water, for example by grinding with sulfite cellulose waste liquor. Further suitable emulsifiers or dispersants are non-ionic products, for example condensation products of aliphatic alcohols, amines or carboxylic acids containing a long-chain hydrocarbon radical containing about 10 to 30 carbon atoms with ethylene oxide, such as the condensation product from octadecyl alcohol with 25 to 30 mols of ethylene oxide, or from soybean fatty acid with 15 mols of ethylene oxide, or from soybean fatty acid with 30 mols of ethylene oxide, or from commercial oleylamine with 15 mols of ethylene oxide, or from dodecylmercaptan with 12 mols of ethylene oxide.

From among suitable anionic emulsifiers there may be mentioned: the sodium salt of dodecyl alcohol sulfuric acid ester, the sodium salt of dodecylbenzenesulfonic acid, the potassium or triethanolamine salt of oleic or abietic acid, or of mixtures of these acids, or the sodium salt of petroleum-sulfonic acid.

Suitable cationic dispersants are, for example, quaternary ammonium compounds, such as cetyl pyridinium bromide or dihydroxyethyldodecyl ammonium chloride.

For the manufacture of solutions for direct spraying there may be further added organic solvents boiling above 100° C. for example, mineral oil fractions, such as Diesel oil or kerosene, also coal tar oils and oils of vegetable or animal origin, as well as hydrocarbons such as alkylated naphthalenes or tetrahydronaphthalene, if desired with concomitant use of mixtures of xylene, cyclohexanols or ketones; also chlorinated hydrocarbons such as tetrachloroethane, trichloroethylene or trichlorobenzenes or tetrachlorobenzenes.

For the manufacture of dusting or strewing materials there may be used as solid vehicles talcum, kaolin, bentonite, calcium carbonate, calcium phosphate or coal, cork meal or wood meal or other materials, of vegetable origin. It is very advantageous to prepare the materials in the form of granulates. The new products in their various forms of application may be admixed in known manner with substances that improve the distribution, adhesion, stability towards rain or the penetration power. As such substances there may be mentioned fatty acids, resins, glue, casein and alginates.

The following examples illustrate the invention. The parts are parts by weight.

EXAMPLE 1

The compound shown under (1) in the above Table 1 was mixed with aqueous sulfite cellulose waste liquor and very finely ground. A series of dilution from 200 parts per million downwards with the dilution factor 2 was prepared by mixing the microdisperse preparation thus obtained with water. 10 ml. each of the liquor were dropped through a pipette into a Petri dish and 10 ml. of a suspension of the nematodes *Anguina tritici, Ditylenchus dipsaci* and *Heterodera schachtii* respectively were added. The Petri dishes were covered and kept for 6 days in diffuse daylight. The broth was then filtered off, the filter residue rinsed with 1 liter of water and then placed for 24 hours on a cotton wool filter infested with nematodes. The surviving nematodes were able to work their way through the filter and to collect in a pipette and were then counted. The nematocidal effect achieved is shown in the following Table 2:

Table 2

ACTIVE PRINCIPLE: 2:5-[DITHIENYL-(2')]-1:3:4-THIADIAZOLE

| Active principle in parts per million | 100 | 50 | 25 | 12.5 | 6.25 | 3.125 | 1.6 | 0.8 | Control 0.0 |
|---|---|---|---|---|---|---|---|---|---|
| Nematodes surviving after 6 days: | | | | | | | | | |
| Anguina tritici | 0 | 0 | 0 | 1 | 0 | 0 | 0 | 0 | 356 |
| Heterodera schachtii | 4 | 2 | 10 | 13 | 4 | 3 | 27 | 18 | 110 |

Good nematocidal effects were also achieved against *Ditylenchus dipsaci*.

EXAMPLE 2

The test for nematocidal effects described in Example 1 was performed, using as active principle the compound (2) in Table 1. The nematocidal effect thus achieved is shown in the following Table 3:

Table 3

ACTIVE PRINCIPLE: 2-[THIENYL-(2')]-5-[4''-CHLOROPHENYL-(1'')-1:3:4-THIADIAZOLE

| Active principle in parts per million | 100 | 50 | 25 | 12.5 | 6.25 | 3.125 | 1.6 | 0.8 | Control 0.0 |
|---|---|---|---|---|---|---|---|---|---|
| Nematodes surviving after 6 days: | | | | | | | | | |
| Anguina tritici | 0 | 0 | 13 | 0 | 0 | 0 | 0 | 0 | 104 |
| Heterodera schachtii | 0 | 0 | 0 | 0 | 0 | 0 | 0 | 0 | 29 |

Good nematocidal effects were also achieved against *Ditylenchus dipsaci*.

EXAMPLE 3

The test for nematocidal effects described in Example 1 was performed, using as active principle the compound (3) in Table 1.

The nematocidal effect thus achieved is shown in the following Table 4:

Table 4

ACTIVE PRINCIPLE: 2-[5'-THIENYL-(2'')-1':3':4-THIADIAZOLYL-(2')]-5-[5''-THIENYL-(2''')-1''':3''':4''-THIADIAZOLYL-(2'')]-THIOPHENE

| Active principle in parts per million | 100 | 50 | 25 | 12.5 | 6.25 | 3.125 | 1.6 | 0.8 | Control 0.0 |
|---|---|---|---|---|---|---|---|---|---|
| Nematodes surviving after 6 days: Anguina tritici | 43 | 20 | 15 | 2 | 29 | 58 | 46 | 77 | 224 |

What is claimed is:

1. A method for combating nematodes which are harmful in agriculture and horticulture, wherein the objects which are to be protected from the nematodes are treated wtih a nematocidal amount of a compound of the formula

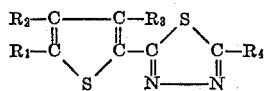

in which $R_1$ represents a member selected from the group consisting of the hydrogen atom, the chlorine atom, alkyl containing 1 to 4 carbon atoms, and

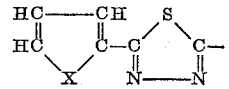

in which X represents a member selected from the group consisting of the oxygen atom and the sulfur atom, $R_2$ and $R_3$ each represents a member selected from the group consisting of the hydrogen atom and alkyl containing 1 to 4 carbon atoms, and $R_4$ represents a member selected from the group consisting of phenyl, a phenyl substituted by at most 2 chlorine atoms, a phenyl substituted by at most 2 alkyl containing at most 4 carbon atoms, a phenyl substituted by methoxy, a phenyl substituted by methoxy and alkyl containing at most 4 carbon atoms, thienyl, diphenyl, naphthyl, pyridyl and furyl.

2. A method as claimed in claim 1, wherein the objects which are to be protected from the nematodes are treated with a nematocidal amount of the compound of the formula

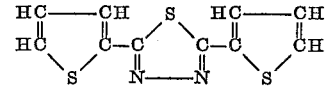

3. A method as claimed in claim 1, wherein the objects which are to be protected from the nematodes are treated with a nematocidal amount of the compound of the formula

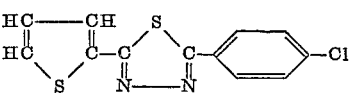

4. A method as claimed in claim 1, wherein the objects which are to be protected from the nematodes are treated with a nematocidal amount of the compound of the formula

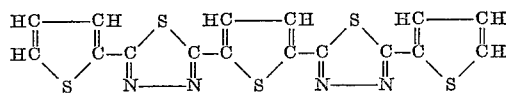

5. A composition for combating nematodes harmful in agriculture and horticulture, which comprises a nematocidal amount of a compound of the formula

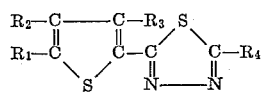

in which $R_1$ represents a member selected from the group consisting of the hydrogen atom, the chlorine atom, alkyl containing 1 to 4 carbon atoms, and

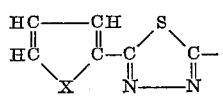

in which X represents a member selected from the group consisting of the oxygen atom and the sulfur atom, $R_2$ and $R_3$ each represents a member selected from the group consisting of the hydrogen atom and alkyl containing 1 to 4 carbon atoms, and $R_4$ represents a member selected from the group consisting of phenyl, a phenyl substituted by at most 2 chlorine atoms, a phenyl substituted by at most 2 alkyl containing at most 4 carbon atoms, a phenyl substituted by methoxy, a phenyl substituted by methoxy and alkyl containing at most 4 carbon atoms, thienyl, diphenyl, naphthyl, pyridyl and furyl, and in addition thereto a member selected from the group consisting of an organic solvent boiling above 100° C., water, a dispersing agent, a wetting agent and a solid carrier.

References Cited by the Examiner
FOREIGN PATENTS
900,815  10/62  Great Britain.

JULIAN S. LEVITT, *Primary Examiner.*